(12) United States Patent  
Stephens (10) Patent No.: US 7,908,763 B2
(45) Date of Patent: Mar. 22, 2011

(54) METHOD OF AND APPARATI FOR SIZING RODEO ROPES

(76) Inventor: Sandy H. Stephens, Prosper, TX (US)

( * ) Notice: Subject to any disclaimer, the term of this patent is extended or adjusted under 35 U.S.C. 154(b) by 346 days.

(21) Appl. No.: 12/157,259

(22) Filed: Jun. 10, 2008

(65) Prior Publication Data

US 2008/0312835 A1 Dec. 18, 2008

Related U.S. Application Data

(60) Provisional application No. 60/943,375, filed on Jun. 12, 2007.

(51) Int. Cl.
*B65H 61/00* (2006.01)
(52) U.S. Cl. .................................. 33/732; 119/805
(58) Field of Classification Search .............. 33/732; 446/247; 119/802, 805, 850

See application file for complete search history.

(56) References Cited

U.S. PATENT DOCUMENTS

| | | | | | |
|---|---|---|---|---|---|
| 474,103 | A | * | 5/1892 | Shaw | 119/805 |
| 504,055 | A | * | 8/1893 | Shaw | 119/805 |
| 1,438,993 | A | * | 12/1922 | Fullington | 57/202 |
| 1,818,301 | A | * | 8/1931 | Canaday | 119/805 |
| 1,953,565 | A | * | 4/1934 | O'Neil | 446/247 |
| 1,993,010 | A | * | 3/1935 | La Rue | 119/805 |
| 2,044,240 | A | * | 6/1936 | Daniels | 446/247 |
| 2,503,567 | A | * | 4/1950 | Sweetman | 446/247 |
| 2,643,638 | A | * | 6/1953 | Villmer | 119/805 |
| 2,669,221 | A | * | 2/1954 | Major | 119/805 |
| 2,771,857 | A | * | 11/1956 | Soreghen | 119/805 |
| 3,165,091 | A | * | 1/1965 | Welton | 119/805 |
| 4,058,049 | A | * | 11/1977 | Bech | 87/8 |
| 4,114,360 | A | * | 9/1978 | Emmons | 57/202 |
| 4,268,037 | A | * | 5/1981 | McKinley et al. | 273/359 |
| 4,395,826 | A | * | 8/1983 | Bidegain et al. | 33/3 C |
| 4,475,481 | A | * | 10/1984 | Carroll | 119/51.02 |
| 4,648,352 | A | * | 3/1987 | Smith | 119/805 |
| 5,340,120 | A | * | 8/1994 | Holyoak | 273/447 |
| 6,119,632 | A | * | 9/2000 | Sullivan | 119/805 |
| 6,168,539 | B1 | * | 1/2001 | Maina | 473/424 |
| 6,595,161 | B2 | * | 7/2003 | France | 119/805 |
| 6,789,509 | B1 | * | 9/2004 | Motsinger | 119/805 |
| 7,011,884 | B1 | * | 3/2006 | Chow et al. | 428/367 |
| 7,111,543 | B2 | * | 9/2006 | Sayatovich | 87/1 |
| 7,234,421 | B2 | * | 6/2007 | Natividade et al. | 119/720 |
| 2002/0189552 | A1 | * | 12/2002 | Sullivan | 119/805 |
| 2004/0121114 | A1 | * | 6/2004 | Piana et al. | 428/85 |
| 2005/0279289 | A1 | * | 12/2005 | Sattler | 119/805 |
| 2006/0217211 | A1 | * | 9/2006 | Cadotte | 472/118 |
| 2007/0089689 | A1 | * | 4/2007 | Stephens et al. | 119/805 |
| 2007/0272168 | A1 | * | 11/2007 | Stephens et al. | 119/805 |
| 2010/0132630 | A1 | * | 6/2010 | Stephens et al. | 119/805 |

\* cited by examiner

*Primary Examiner* — G. Bradley Bennett
*Assistant Examiner* — Tania C Courson (57) ABSTRACT

A method for and apparatus for determining the loop size of a rodeo rope comprising determining a circumference C, determining a spoke S length, providing a chart having loop sizes corresponding to a range of circumference measurements and spoke measurements, and finding a loop size based upon the measured circumference and measured spoke. The loop size refers to a set of parameters that characterize the rope. The method can be implemented by a computer and associated software.

19 Claims, 8 Drawing Sheets

REVOLUTION LOOP SIZING CHART

SPOKE LENGTH(S) (INCHES)

LOOP CIRCUMFERENCE (INCHES)

| | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 |
|---|---|---|---|---|---|---|---|---|---|---|---|---|---|---|---|---|---|---|---|---|---|---|---|---|---|---|---|---|---|---|---|---|---|---|---|---|
| 105 | C | C | C | C | C | C | 1 | 1 | 1 | 1 | 1 | 1 | 2 | 2 | 2 | 2 | 2 | 2 | 3 | 3 | 3 | 3 | 3 | 3 | 3 | 4 | 4 | 4 | 4 | 4 | 4 | 4 | 5 | 5 | 5 | 5 |
| 106 | C | C | C | C | C | 1 | 1 | 1 | 1 | 1 | 1 | 2 | 2 | 2 | 2 | 2 | 2 | 2 | 3 | 3 | 3 | 3 | 3 | 3 | 4 | 4 | 4 | 4 | 4 | 4 | 4 | 4 | 5 | 5 | 5 | 5 |
| 107 | C | C | C | C | 1 | 1 | 1 | 1 | 1 | 1 | 2 | 2 | 2 | 2 | 2 | 2 | 2 | 3 | 3 | 3 | 3 | 3 | 3 | 4 | 4 | 4 | 4 | 4 | 4 | 4 | 4 | 5 | 5 | 5 | 5 | 5 |
| 108 | C | C | C | 1 | 1 | 1 | 1 | 1 | 1 | 2 | 2 | 2 | 2 | 2 | 2 | 2 | 3 | 3 | 3 | 3 | 3 | 3 | 4 | 4 | 4 | 4 | 4 | 4 | 4 | 4 | 5 | 5 | 5 | 5 | 5 | 5 |
| 109 | C | C | 1 | 1 | 1 | 1 | 1 | 1 | 2 | 2 | 2 | 2 | 2 | 2 | 2 | 3 | 3 | 3 | 3 | 3 | 3 | 4 | 4 | 4 | 4 | 4 | 4 | 4 | 4 | 5 | 5 | 5 | 5 | 5 | 5 | 5 |
| 110 | C | 1 | 1 | 1 | 1 | 1 | 1 | 2 | 2 | 2 | 2 | 2 | 2 | 2 | 3 | 3 | 3 | 3 | 3 | 3 | 4 | 4 | 4 | 4 | 4 | 4 | 4 | 4 | 5 | 5 | 5 | 5 | 5 | 5 | 5 | 5 |
| 111 | 1 | 1 | 1 | 1 | 1 | 1 | 2 | 2 | 2 | 2 | 2 | 2 | 2 | 3 | 3 | 3 | 3 | 3 | 3 | 4 | 4 | 4 | 4 | 4 | 4 | 4 | 4 | 5 | 5 | 5 | 5 | 5 | 5 | 5 | 5 | 5 |
| 112 | 1 | 1 | 1 | 1 | 1 | 2 | 2 | 2 | 2 | 2 | 2 | 2 | 3 | 3 | 3 | 3 | 3 | 3 | 4 | 4 | 4 | 4 | 4 | 4 | 4 | 4 | 5 | 5 | 5 | 5 | 5 | 5 | 5 | 5 | 5 | 5 |
| 113 | 1 | 1 | 1 | 1 | 2 | 2 | 2 | 2 | 2 | 2 | 2 | 3 | 3 | 3 | 3 | 3 | 3 | 4 | 4 | 4 | 4 | 4 | 4 | 4 | 4 | 5 | 5 | 5 | 5 | 5 | 5 | 5 | 5 | 5 | 5 | 6 |
| 114 | 1 | 1 | 1 | 2 | 2 | 2 | 2 | 2 | 2 | 2 | 3 | 3 | 3 | 3 | 3 | 3 | 4 | 4 | 4 | 4 | 4 | 4 | 4 | 4 | 5 | 5 | 5 | 5 | 5 | 5 | 5 | 5 | 5 | 5 | 6 | 6 |
| 115 | 1 | 1 | 2 | 2 | 2 | 2 | 2 | 2 | 2 | 3 | 3 | 3 | 3 | 3 | 3 | 4 | 4 | 4 | 4 | 4 | 4 | 4 | 4 | 5 | 5 | 5 | 5 | 5 | 5 | 5 | 5 | 5 | 5 | 6 | 6 | 6 |
| 116 | 1 | 2 | 2 | 2 | 2 | 2 | 2 | 2 | 3 | 3 | 3 | 3 | 3 | 3 | 4 | 4 | 4 | 4 | 4 | 4 | 4 | 4 | 5 | 5 | 5 | 5 | 5 | 5 | 5 | 5 | 5 | 5 | 6 | 6 | 6 | 6 |
| 117 | 2 | 2 | 2 | 2 | 2 | 2 | 2 | 3 | 3 | 3 | 3 | 3 | 3 | 4 | 4 | 4 | 4 | 4 | 4 | 4 | 4 | 5 | 5 | 5 | 5 | 5 | 5 | 5 | 5 | 5 | 5 | 5 | 6 | 6 | 6 | 6 |
| 118 | 2 | 2 | 2 | 2 | 2 | 2 | 3 | 3 | 3 | 3 | 3 | 3 | 4 | 4 | 4 | 4 | 4 | 4 | 4 | 4 | 5 | 5 | 5 | 5 | 5 | 5 | 5 | 5 | 5 | 5 | 5 | 6 | 6 | 6 | 6 | 6 |
| 119 | 2 | 2 | 2 | 2 | 2 | 3 | 3 | 3 | 3 | 3 | 3 | 4 | 4 | 4 | 4 | 4 | 4 | 4 | 4 | 5 | 5 | 5 | 5 | 5 | 5 | 5 | 5 | 5 | 5 | 5 | 6 | 6 | 6 | 6 | 6 | 6 |
| 120 | 2 | 2 | 2 | 2 | 3 | 3 | 3 | 3 | 3 | 3 | 4 | 4 | 4 | 4 | 4 | 4 | 4 | 4 | 5 | 5 | 5 | 5 | 5 | 5 | 5 | 5 | 5 | 5 | 5 | 6 | 6 | 6 | 6 | 6 | 6 | 6 |
| 121 | 2 | 2 | 2 | 3 | 3 | 3 | 3 | 3 | 3 | 4 | 4 | 4 | 4 | 4 | 4 | 4 | 4 | 5 | 5 | 5 | 5 | 5 | 5 | 5 | 5 | 5 | 5 | 5 | 6 | 6 | 6 | 6 | 6 | 6 | 6 | 6 |
| 122 | 2 | 2 | 3 | 3 | 3 | 3 | 3 | 3 | 4 | 4 | 4 | 4 | 4 | 4 | 4 | 4 | 5 | 5 | 5 | 5 | 5 | 5 | 5 | 5 | 5 | 5 | 5 | 6 | 6 | 6 | 6 | 6 | 6 | 6 | 6 | 6 |
| 123 | 2 | 3 | 3 | 3 | 3 | 3 | 3 | 4 | 4 | 4 | 4 | 4 | 4 | 4 | 4 | 5 | 5 | 5 | 5 | 5 | 5 | 5 | 5 | 5 | 5 | 5 | 6 | 6 | 6 | 6 | 6 | 6 | 6 | 6 | 6 | 6 |
| 124 | 3 | 3 | 3 | 3 | 3 | 3 | 4 | 4 | 4 | 4 | 4 | 4 | 4 | 4 | 5 | 5 | 5 | 5 | 5 | 5 | 5 | 5 | 5 | 5 | 5 | 6 | 6 | 6 | 6 | 6 | 6 | 6 | 6 | 6 | 6 | 6 |
| 125 | 3 | 3 | 3 | 3 | 3 | 4 | 4 | 4 | 4 | 4 | 4 | 4 | 4 | 5 | 5 | 5 | 5 | 5 | 5 | 5 | 5 | 5 | 5 | 5 | 6 | 6 | 6 | 6 | 6 | 6 | 6 | 6 | 6 | 6 | 6 | 6 |
| 126 | 3 | 3 | 3 | 3 | 4 | 4 | 4 | 4 | 4 | 4 | 4 | 4 | 5 | 5 | 5 | 5 | 5 | 5 | 5 | 5 | 5 | 5 | 5 | 6 | 6 | 6 | 6 | 6 | 6 | 6 | 6 | 6 | 6 | 6 | 6 | 6 |
| 127 | 3 | 3 | 3 | 4 | 4 | 4 | 4 | 4 | 4 | 4 | 4 | 5 | 5 | 5 | 5 | 5 | 5 | 5 | 5 | 5 | 5 | 5 | 6 | 6 | 6 | 6 | 6 | 6 | 6 | 6 | 6 | 6 | 6 | 6 | 6 | 6 |
| 128 | 3 | 3 | 4 | 4 | 4 | 4 | 4 | 4 | 4 | 4 | 5 | 5 | 5 | 5 | 5 | 5 | 5 | 5 | 5 | 5 | 5 | 6 | 6 | 6 | 6 | 6 | 6 | 6 | 6 | 6 | 6 | 6 | 6 | 6 | 6 | 7 |
| 129 | 3 | 4 | 4 | 4 | 4 | 4 | 4 | 4 | 4 | 5 | 5 | 5 | 5 | 5 | 5 | 5 | 5 | 5 | 5 | 5 | 6 | 6 | 6 | 6 | 6 | 6 | 6 | 6 | 6 | 6 | 6 | 6 | 6 | 6 | 7 | 7 |
| 130 | 4 | 4 | 4 | 4 | 4 | 4 | 4 | 4 | 5 | 5 | 5 | 5 | 5 | 5 | 5 | 5 | 5 | 5 | 5 | 6 | 6 | 6 | 6 | 6 | 6 | 6 | 6 | 6 | 6 | 6 | 6 | 6 | 6 | 7 | 7 | 7 |
| 131 | 4 | 4 | 4 | 4 | 4 | 4 | 4 | 5 | 5 | 5 | 5 | 5 | 5 | 5 | 5 | 5 | 5 | 5 | 6 | 6 | 6 | 6 | 6 | 6 | 6 | 6 | 6 | 6 | 6 | 6 | 6 | 6 | 7 | 7 | 7 | 7 |
| 132 | 4 | 4 | 4 | 4 | 4 | 4 | 5 | 5 | 5 | 5 | 5 | 5 | 5 | 5 | 5 | 5 | 5 | 6 | 6 | 6 | 6 | 6 | 6 | 6 | 6 | 6 | 6 | 6 | 6 | 6 | 6 | 7 | 7 | 7 | 7 | 7 |
| 133 | 4 | 4 | 4 | 4 | 4 | 5 | 5 | 5 | 5 | 5 | 5 | 5 | 5 | 5 | 5 | 5 | 6 | 6 | 6 | 6 | 6 | 6 | 6 | 6 | 6 | 6 | 6 | 6 | 6 | 6 | 7 | 7 | 7 | 7 | 7 | 7 |
| 134 | 4 | 4 | 4 | 4 | 5 | 5 | 5 | 5 | 5 | 5 | 5 | 5 | 5 | 5 | 5 | 6 | 6 | 6 | 6 | 6 | 6 | 6 | 6 | 6 | 6 | 6 | 6 | 6 | 6 | 7 | 7 | 7 | 7 | 7 | 7 | 7 |
| 135 | 4 | 4 | 4 | 5 | 5 | 5 | 5 | 5 | 5 | 5 | 5 | 5 | 5 | 5 | 6 | 6 | 6 | 6 | 6 | 6 | 6 | 6 | 6 | 6 | 6 | 6 | 6 | 6 | 7 | 7 | 7 | 7 | 7 | 7 | 7 | 7 |
| 136 | 4 | 4 | 5 | 5 | 5 | 5 | 5 | 5 | 5 | 5 | 5 | 5 | 5 | 6 | 6 | 6 | 6 | 6 | 6 | 6 | 6 | 6 | 6 | 6 | 6 | 6 | 6 | 7 | 7 | 7 | 7 | 7 | 7 | 7 | 7 | 7 |
| 137 | 4 | 5 | 5 | 5 | 5 | 5 | 5 | 5 | 5 | 5 | 5 | 5 | 6 | 6 | 6 | 6 | 6 | 6 | 6 | 6 | 6 | 6 | 6 | 6 | 6 | 6 | 7 | 7 | 7 | 7 | 7 | 7 | 7 | 7 | 7 | 7 |

REVOLUTION LOOP SIZING CHART

SPOKE LENGTH(S) (INCHES)

| C | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 |
|---|----|----|----|----|----|----|----|----|----|----|----|----|----|----|----|----|----|----|----|----|----|----|----|----|----|----|----|----|----|----|----|----|----|----|----|----|
| 173 | 5 | 5 | 5 | 5 | 5 | 6 | 6 | 6 | 6 | 6 | 6 | 6 | 6 | 7 | 7 | 7 | 7 | 7 | 7 | 7 | 7 | 8 | 8 | 8 | 8 | 8 | 8 | 8 | 8 | C | C | C | C | C | C | C |
| 174 | 5 | 5 | 5 | 5 | 5 | 6 | 6 | 6 | 6 | 6 | 6 | 6 | 6 | 7 | 7 | 7 | 7 | 7 | 7 | 7 | 7 | 8 | 8 | 8 | 8 | 8 | 8 | 8 | 8 | C | C | C | C | C | C | C |
| 175 | 5 | 5 | 5 | 5 | 5 | 6 | 6 | 6 | 6 | 6 | 6 | 6 | 6 | 7 | 7 | 7 | 7 | 7 | 7 | 7 | 7 | 8 | 8 | 8 | 8 | 8 | 8 | 8 | 8 | C | C | C | C | C | C | C |
| 176 | 5 | 5 | 5 | 5 | 6 | 6 | 6 | 6 | 6 | 6 | 6 | 6 | 7 | 7 | 7 | 7 | 7 | 7 | 7 | 7 | 8 | 8 | 8 | 8 | 8 | 8 | 8 | 8 | C | C | C | C | C | C | C | C |
| 177 | 5 | 5 | 5 | 6 | 6 | 6 | 6 | 6 | 6 | 6 | 6 | 7 | 7 | 7 | 7 | 7 | 7 | 7 | 7 | 8 | 8 | 8 | 8 | 8 | 8 | 8 | 8 | C | C | C | C | C | C | C | C | C |
| 178 | 5 | 5 | 5 | 6 | 6 | 6 | 6 | 6 | 6 | 6 | 7 | 7 | 7 | 7 | 7 | 7 | 7 | 7 | 8 | 8 | 8 | 8 | 8 | 8 | 8 | 8 | C | C | C | C | C | C | C | C | C | C |
| 179 | 5 | 5 | 6 | 6 | 6 | 6 | 6 | 6 | 6 | 6 | 7 | 7 | 7 | 7 | 7 | 7 | 7 | 7 | 8 | 8 | 8 | 8 | 8 | 8 | 8 | 8 | C | C | C | C | C | C | C | C | C | C |
| 180 | 5 | 5 | 6 | 6 | 6 | 6 | 6 | 6 | 6 | 7 | 7 | 7 | 7 | 7 | 7 | 7 | 7 | 7 | 8 | 8 | 8 | 8 | 8 | 8 | 8 | C | C | C | C | C | C | C | C | C | C | C |

Loop Circ (C)

Figure 5B

| SPOKE LENGTH | LOOP CIRCUMFERENCE (INCHES) | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| | 105 | 106 | 107 | 108 | 109 | 110 | 111 | 112 | 113 | 114 | 115 | 116 | 117 | 118 | 119 | 120 | 121 | 122 | 123 | 124 | 125 | 126 | 127 | 128 | 129 | 130 | 131 | 132 | 133 |
| 10 | 63 | 63 | 64 | 64 | 65 | 65 | 66 | 66 | 67 | 67 | 68 | 68 | 69 | 69 | 70 | 70 | 71 | 71 | 72 | 72 | 73 | 73 | 74 | 74 | 75 | 75 | 76 | 76 | 77 |
| 11 | 64 | 64 | 65 | 65 | 66 | 66 | 67 | 67 | 68 | 68 | 69 | 69 | 70 | 70 | 71 | 71 | 72 | 72 | 73 | 73 | 74 | 74 | 75 | 75 | 76 | 76 | 77 | 77 | 78 |
| 12 | 65 | 65 | 66 | 66 | 67 | 67 | 68 | 68 | 69 | 69 | 70 | 70 | 71 | 71 | 72 | 72 | 73 | 73 | 74 | 74 | 75 | 75 | 76 | 76 | 77 | 77 | 78 | 78 | 79 |
| 13 | 66 | 66 | 67 | 67 | 68 | 68 | 69 | 69 | 70 | 70 | 71 | 71 | 72 | 72 | 73 | 73 | 74 | 74 | 75 | 75 | 76 | 76 | 77 | 77 | 78 | 78 | 79 | 79 | 80 |
| 14 | 67 | 67 | 68 | 68 | 69 | 69 | 70 | 70 | 71 | 71 | 72 | 72 | 73 | 73 | 74 | 74 | 75 | 75 | 76 | 76 | 77 | 77 | 78 | 78 | 79 | 79 | 80 | 80 | 81 |
| 15 | 68 | 68 | 69 | 69 | 70 | 70 | 71 | 71 | 72 | 72 | 73 | 73 | 74 | 74 | 75 | 75 | 76 | 76 | 77 | 77 | 78 | 78 | 79 | 79 | 80 | 80 | 81 | 81 | 82 |
| 16 | 69 | 69 | 70 | 70 | 71 | 71 | 72 | 72 | 73 | 73 | 74 | 74 | 75 | 75 | 76 | 76 | 77 | 77 | 78 | 78 | 79 | 79 | 80 | 80 | 81 | 81 | 82 | 82 | 83 |
| 17 | 70 | 70 | 71 | 71 | 72 | 72 | 73 | 73 | 74 | 74 | 75 | 75 | 76 | 76 | 77 | 77 | 78 | 78 | 79 | 79 | 80 | 80 | 81 | 81 | 82 | 82 | 83 | 83 | 84 |
| 18 | 71 | 71 | 72 | 72 | 73 | 73 | 74 | 74 | 75 | 75 | 76 | 76 | 77 | 77 | 78 | 78 | 79 | 79 | 80 | 80 | 81 | 81 | 82 | 82 | 83 | 83 | 84 | 84 | 85 |
| 19 | 72 | 72 | 73 | 73 | 74 | 74 | 75 | 75 | 76 | 76 | 77 | 77 | 78 | 78 | 79 | 79 | 80 | 80 | 81 | 81 | 82 | 82 | 83 | 83 | 84 | 84 | 85 | 85 | 86 |
| 20 | 73 | 73 | 74 | 74 | 75 | 75 | 76 | 76 | 77 | 77 | 78 | 78 | 79 | 79 | 80 | 80 | 81 | 81 | 82 | 82 | 83 | 83 | 84 | 84 | 85 | 85 | 86 | 86 | 87 |
| 21 | 74 | 74 | 75 | 75 | 76 | 76 | 77 | 77 | 78 | 78 | 79 | 79 | 80 | 80 | 81 | 81 | 82 | 82 | 83 | 83 | 84 | 84 | 85 | 85 | 86 | 86 | 87 | 87 | 88 |
| 22 | 75 | 75 | 76 | 76 | 77 | 77 | 78 | 78 | 79 | 79 | 80 | 80 | 81 | 81 | 82 | 82 | 83 | 83 | 84 | 84 | 85 | 85 | 86 | 86 | 87 | 87 | 88 | 88 | 89 |
| 23 | 76 | 76 | 77 | 77 | 78 | 78 | 79 | 79 | 80 | 80 | 81 | 81 | 82 | 82 | 83 | 83 | 84 | 84 | 85 | 85 | 86 | 86 | 87 | 87 | 88 | 88 | 89 | 89 | 90 |
| 24 | 77 | 77 | 78 | 78 | 79 | 79 | 80 | 80 | 81 | 81 | 82 | 82 | 83 | 83 | 84 | 84 | 85 | 85 | 86 | 86 | 87 | 87 | 88 | 88 | 89 | 89 | 90 | 90 | 91 |
| 25 | 78 | 78 | 79 | 79 | 80 | 80 | 81 | 81 | 82 | 82 | 83 | 83 | 84 | 84 | 85 | 85 | 86 | 86 | 87 | 87 | 88 | 88 | 89 | 89 | 90 | 90 | 91 | 91 | 92 |
| 26 | 79 | 79 | 80 | 80 | 81 | 81 | 82 | 82 | 83 | 83 | 84 | 84 | 85 | 85 | 86 | 86 | 87 | 87 | 88 | 88 | 89 | 89 | 90 | 90 | 91 | 91 | 92 | 92 | 93 |
| 27 | 80 | 80 | 81 | 81 | 82 | 82 | 83 | 83 | 84 | 84 | 85 | 85 | 86 | 86 | 87 | 87 | 88 | 88 | 89 | 89 | 90 | 90 | 91 | 91 | 92 | 92 | 93 | 93 | 94 |
| 28 | 81 | 81 | 82 | 82 | 83 | 83 | 84 | 84 | 85 | 85 | 86 | 86 | 87 | 87 | 88 | 88 | 89 | 89 | 90 | 90 | 91 | 91 | 92 | 92 | 93 | 93 | 94 | 94 | 95 |
| 29 | 82 | 82 | 83 | 83 | 84 | 84 | 85 | 85 | 86 | 86 | 87 | 87 | 88 | 88 | 89 | 89 | 90 | 90 | 91 | 91 | 92 | 92 | 93 | 93 | 94 | 94 | 95 | 95 | 96 |
| 30 | 83 | 83 | 84 | 84 | 85 | 85 | 86 | 86 | 87 | 87 | 88 | 88 | 89 | 89 | 90 | 90 | 91 | 91 | 92 | 92 | 93 | 93 | 94 | 94 | 95 | 95 | 96 | 96 | 97 |
| 31 | 84 | 84 | 85 | 85 | 86 | 86 | 87 | 87 | 88 | 88 | 89 | 89 | 90 | 90 | 91 | 91 | 92 | 92 | 93 | 93 | 94 | 94 | 95 | 95 | 96 | 96 | 97 | 97 | 98 |
| 32 | 85 | 85 | 86 | 86 | 87 | 87 | 88 | 88 | 89 | 89 | 90 | 90 | 91 | 91 | 92 | 92 | 93 | 93 | 94 | 94 | 95 | 95 | 96 | 96 | 97 | 97 | 98 | 98 | 99 |
| 33 | 86 | 86 | 87 | 87 | 88 | 88 | 89 | 89 | 90 | 90 | 91 | 91 | 92 | 92 | 93 | 93 | 94 | 94 | 95 | 95 | 96 | 96 | 97 | 97 | 98 | 98 | 99 | 99 | 100 |
| 34 | 87 | 87 | 88 | 88 | 89 | 89 | 90 | 90 | 91 | 91 | 92 | 92 | 93 | 93 | 94 | 94 | 95 | 95 | 96 | 96 | 97 | 97 | 98 | 98 | 99 | 99 | 100 | 100 | 101 |
| 35 | 88 | 88 | 89 | 89 | 90 | 90 | 91 | 91 | 92 | 92 | 93 | 93 | 94 | 94 | 95 | 95 | 96 | 96 | 97 | 97 | 98 | 98 | 99 | 99 | 100 | 100 | 101 | 101 | 102 |
| 36 | 89 | 89 | 90 | 90 | 91 | 91 | 92 | 92 | 93 | 93 | 94 | 94 | 95 | 95 | 96 | 96 | 97 | 97 | 98 | 98 | 99 | 99 | 100 | 100 | 101 | 101 | 102 | 102 | 103 |
| 37 | 90 | 90 | 91 | 91 | 92 | 92 | 93 | 93 | 94 | 94 | 95 | 95 | 96 | 96 | 97 | 97 | 98 | 98 | 99 | 99 | 100 | 100 | 101 | 101 | 102 | 102 | 103 | 103 | 104 |
| 38 | 91 | 91 | 92 | 92 | 93 | 93 | 94 | 94 | 95 | 95 | 96 | 96 | 97 | 97 | 98 | 98 | 99 | 99 | 100 | 100 | 101 | 101 | 102 | 102 | 103 | 103 | 104 | 104 | 105 |
| 39 | 92 | 92 | 93 | 93 | 94 | 94 | 95 | 95 | 96 | 96 | 97 | 97 | 98 | 98 | 99 | 99 | 100 | 100 | 101 | 101 | 102 | 102 | 103 | 103 | 104 | 104 | 105 | 105 | 106 |
| 40 | 93 | 93 | 94 | 94 | 95 | 95 | 96 | 96 | 97 | 97 | 98 | 98 | 99 | 99 | 100 | 100 | 101 | 101 | 102 | 102 | 103 | 103 | 104 | 104 | 105 | 105 | 106 | 106 | 107 |
| 41 | 94 | 94 | 95 | 95 | 96 | 96 | 97 | 97 | 98 | 98 | 99 | 99 | 100 | 100 | 101 | 101 | 102 | 102 | 103 | 103 | 104 | 104 | 105 | 105 | 106 | 106 | 107 | 107 | 108 |
| 42 | 95 | 95 | 96 | 96 | 97 | 97 | 98 | 98 | 99 | 99 | 100 | 100 | 101 | 101 | 102 | 102 | 103 | 103 | 104 | 104 | 105 | 105 | 106 | 106 | 107 | 107 | 108 | 108 | 109 |
| 43 | 96 | 96 | 97 | 97 | 98 | 98 | 99 | 99 | 100 | 100 | 101 | 101 | 102 | 102 | 103 | 103 | 104 | 104 | 105 | 105 | 106 | 106 | 107 | 107 | 108 | 108 | 109 | 109 | 110 |
| 44 | 97 | 97 | 98 | 98 | 99 | 99 | 100 | 100 | 101 | 101 | 102 | 102 | 103 | 103 | 104 | 104 | 105 | 105 | 106 | 106 | 107 | 107 | 108 | 108 | 109 | 109 | 110 | 110 | 111 |

Figure 5B

LOOP CIRCUMFERENCE (INCHES)

| SPOKE LENGTH | 134 | 135 | 136 | 137 | 138 | 139 | 140 | 141 | 142 | 143 | 144 | 145 | 146 | 147 | 148 | 149 | 150 | 151 | 152 | 153 | 154 | 155 | 156 | 157 | 158 | 159 | 160 | 161 |
|---|---|---|---|---|---|---|---|---|---|---|---|---|---|---|---|---|---|---|---|---|---|---|---|---|---|---|---|---|
| 10 | 77 | 78 | 78 | 79 | 79 | 80 | 80 | 81 | 81 | 82 | 82 | 83 | 83 | 84 | 84 | 85 | 85 | 86 | 86 | 87 | 87 | 88 | 88 | 89 | 89 | 90 | 90 | 91 |
| 11 | 78 | 79 | 79 | 80 | 80 | 81 | 81 | 82 | 82 | 83 | 83 | 84 | 84 | 85 | 85 | 86 | 86 | 87 | 87 | 88 | 88 | 89 | 89 | 90 | 90 | 91 | 91 | 92 |
| 12 | 79 | 80 | 80 | 81 | 81 | 82 | 82 | 83 | 83 | 84 | 84 | 85 | 85 | 86 | 86 | 87 | 87 | 88 | 88 | 89 | 89 | 90 | 90 | 91 | 91 | 92 | 92 | 93 |
| 13 | 80 | 81 | 81 | 82 | 82 | 83 | 83 | 84 | 84 | 85 | 85 | 86 | 86 | 87 | 87 | 88 | 88 | 89 | 89 | 90 | 90 | 91 | 91 | 92 | 92 | 93 | 93 | 94 |
| 14 | 81 | 82 | 82 | 83 | 83 | 84 | 84 | 85 | 85 | 86 | 86 | 87 | 87 | 88 | 88 | 89 | 89 | 90 | 90 | 91 | 91 | 92 | 92 | 93 | 93 | 94 | 94 | 95 |
| 15 | 82 | 83 | 83 | 84 | 84 | 85 | 85 | 86 | 86 | 87 | 87 | 88 | 88 | 89 | 89 | 90 | 90 | 91 | 91 | 92 | 92 | 93 | 93 | 94 | 94 | 95 | 95 | 96 |
| 16 | 83 | 84 | 84 | 85 | 85 | 86 | 86 | 87 | 87 | 88 | 88 | 89 | 89 | 90 | 90 | 91 | 91 | 92 | 92 | 93 | 93 | 94 | 94 | 95 | 95 | 96 | 96 | 97 |
| 17 | 84 | 85 | 85 | 86 | 86 | 87 | 87 | 88 | 88 | 89 | 89 | 90 | 90 | 91 | 91 | 92 | 92 | 93 | 93 | 94 | 94 | 95 | 95 | 96 | 96 | 97 | 97 | 98 |
| 18 | 85 | 86 | 86 | 87 | 87 | 88 | 88 | 89 | 89 | 90 | 90 | 91 | 91 | 92 | 92 | 93 | 93 | 94 | 94 | 95 | 95 | 96 | 96 | 97 | 97 | 98 | 98 | 99 |
| 19 | 86 | 87 | 87 | 88 | 88 | 89 | 89 | 90 | 90 | 91 | 91 | 92 | 92 | 93 | 93 | 94 | 94 | 95 | 95 | 96 | 96 | 97 | 97 | 98 | 98 | 99 | 99 | 100 |
| 20 | 87 | 88 | 88 | 89 | 89 | 90 | 90 | 91 | 91 | 92 | 92 | 93 | 93 | 94 | 94 | 95 | 95 | 96 | 96 | 97 | 97 | 98 | 98 | 99 | 99 | 100 | 100 | 101 |
| 21 | 88 | 89 | 89 | 90 | 90 | 91 | 91 | 92 | 92 | 93 | 93 | 94 | 94 | 95 | 95 | 96 | 96 | 97 | 97 | 98 | 98 | 99 | 99 | 100 | 100 | 101 | 101 | 102 |
| 22 | 89 | 90 | 90 | 91 | 91 | 92 | 92 | 93 | 93 | 94 | 94 | 95 | 95 | 96 | 96 | 97 | 97 | 98 | 98 | 99 | 99 | 100 | 100 | 101 | 101 | 102 | 102 | 103 |
| 23 | 90 | 91 | 91 | 92 | 92 | 93 | 93 | 94 | 94 | 95 | 95 | 96 | 96 | 97 | 97 | 98 | 98 | 99 | 99 | 100 | 100 | 101 | 101 | 102 | 102 | 103 | 103 | 104 |
| 24 | 91 | 92 | 92 | 93 | 93 | 94 | 94 | 95 | 95 | 96 | 96 | 97 | 97 | 98 | 98 | 99 | 99 | 100 | 100 | 101 | 101 | 102 | 102 | 103 | 103 | 104 | 104 | 105 |
| 25 | 92 | 93 | 93 | 94 | 94 | 95 | 95 | 96 | 96 | 97 | 97 | 98 | 98 | 99 | 99 | 100 | 100 | 101 | 101 | 102 | 102 | 103 | 103 | 104 | 104 | 105 | 105 | 106 |
| 26 | 93 | 94 | 94 | 95 | 95 | 96 | 96 | 97 | 97 | 98 | 98 | 99 | 99 | 100 | 100 | 101 | 101 | 102 | 102 | 103 | 103 | 104 | 104 | 105 | 105 | 106 | 106 | 107 |
| 27 | 94 | 95 | 95 | 96 | 96 | 97 | 97 | 98 | 98 | 99 | 99 | 100 | 100 | 101 | 101 | 102 | 102 | 103 | 103 | 104 | 104 | 105 | 105 | 106 | 106 | 107 | 107 | 108 |
| 28 | 95 | 96 | 96 | 97 | 97 | 98 | 98 | 99 | 99 | 100 | 100 | 101 | 101 | 102 | 102 | 103 | 103 | 104 | 104 | 105 | 105 | 106 | 106 | 107 | 107 | 108 | 108 | 109 |
| 29 | 96 | 97 | 97 | 98 | 98 | 99 | 99 | 100 | 100 | 101 | 101 | 102 | 102 | 103 | 103 | 104 | 104 | 105 | 105 | 106 | 106 | 107 | 107 | 108 | 108 | 109 | 109 | 110 |
| 30 | 97 | 98 | 98 | 99 | 99 | 100 | 100 | 101 | 101 | 102 | 102 | 103 | 103 | 104 | 104 | 105 | 105 | 106 | 106 | 107 | 107 | 108 | 108 | 109 | 109 | 110 | 110 | 111 |
| 31 | 98 | 99 | 99 | 100 | 100 | 101 | 101 | 102 | 102 | 103 | 103 | 104 | 104 | 105 | 105 | 106 | 106 | 107 | 107 | 108 | 108 | 109 | 109 | 110 | 110 | 111 | 111 | 112 |
| 32 | 99 | 100 | 100 | 101 | 101 | 102 | 102 | 103 | 103 | 104 | 104 | 105 | 105 | 106 | 106 | 107 | 107 | 108 | 108 | 109 | 109 | 110 | 110 | 111 | 111 | 112 | 112 | 113 |
| 33 | 100 | 101 | 101 | 102 | 102 | 103 | 103 | 104 | 104 | 105 | 105 | 106 | 106 | 107 | 107 | 108 | 108 | 109 | 109 | 110 | 110 | 111 | 111 | 112 | 112 | 113 | 113 | 114 |
| 34 | 101 | 102 | 102 | 103 | 103 | 104 | 104 | 105 | 105 | 106 | 106 | 107 | 107 | 108 | 108 | 109 | 109 | 110 | 110 | 111 | 111 | 112 | 112 | 113 | 113 | 114 | 114 | 115 |
| 35 | 102 | 103 | 103 | 104 | 104 | 105 | 105 | 106 | 106 | 107 | 107 | 108 | 108 | 109 | 109 | 110 | 110 | 111 | 111 | 112 | 112 | 113 | 113 | 114 | 114 | 115 | 115 | 116 |
| 36 | 103 | 104 | 104 | 105 | 105 | 106 | 106 | 107 | 107 | 108 | 108 | 109 | 109 | 110 | 110 | 111 | 111 | 112 | 112 | 113 | 113 | 114 | 114 | 115 | 115 | 116 | 116 | 117 |
| 37 | 104 | 105 | 105 | 106 | 106 | 107 | 107 | 108 | 108 | 109 | 109 | 110 | 110 | 111 | 111 | 112 | 112 | 113 | 113 | 114 | 114 | 115 | 115 | 116 | 116 | 117 | 117 | 118 |
| 38 | 105 | 106 | 106 | 107 | 107 | 108 | 108 | 109 | 109 | 110 | 110 | 111 | 111 | 112 | 112 | 113 | 113 | 114 | 114 | 115 | 115 | 116 | 116 | 117 | 117 | 118 | 118 | 119 |
| 39 | 106 | 107 | 107 | 108 | 108 | 109 | 109 | 110 | 110 | 111 | 111 | 112 | 112 | 113 | 113 | 114 | 114 | 115 | 115 | 116 | 116 | 117 | 117 | 118 | 118 | 119 | 119 | 120 |
| 40 | 107 | 108 | 108 | 109 | 109 | 110 | 110 | 111 | 111 | 112 | 112 | 113 | 113 | 114 | 114 | 115 | 115 | 116 | 116 | 117 | 117 | 118 | 118 | 119 | 119 | 120 | 120 | 121 |
| 41 | 108 | 109 | 109 | 110 | 110 | 111 | 111 | 112 | 112 | 113 | 113 | 114 | 114 | 115 | 115 | 116 | 116 | 117 | 117 | 118 | 118 | 119 | 119 | 120 | 120 | 121 | 121 | 122 |
| 42 | 109 | 110 | 110 | 111 | 111 | 112 | 112 | 113 | 113 | 114 | 114 | 115 | 115 | 116 | 116 | 117 | 117 | 118 | 118 | 119 | 119 | 120 | 120 | 121 | 121 | 122 | 122 | 123 |
| 43 | 110 | 111 | 111 | 112 | 112 | 113 | 113 | 114 | 114 | 115 | 115 | 116 | 116 | 117 | 117 | 118 | 118 | 119 | 119 | 120 | 120 | 121 | 121 | 122 | 122 | 123 | 123 | 124 |
| 44 | 111 | 112 | 112 | 113 | 113 | 114 | 114 | 115 | 115 | 116 | 116 | 117 | 117 | 118 | 118 | 119 | 119 | 120 | 120 | 121 | 121 | 122 | 122 | 123 | 123 | 124 | 124 | 125 |

Figure 5B

LOOP CIRCUMFERENCE (INCHES) / SPOKE LENGTH

| SPOKE LENGTH | 162 | 163 | 164 | 165 | 166 | 167 | 168 | 169 | 170 | 171 | 172 | 173 | 174 | 175 | 176 | 177 | 178 | 179 | 180 |
|---|---|---|---|---|---|---|---|---|---|---|---|---|---|---|---|---|---|---|---|
| 10 | 91 | 92 | 92 | 93 | 93 | 94 | 94 | 95 | 95 | 96 | 96 | 97 | 97 | 98 | 98 | 99 | 99 | 100 | 100 |
| 11 | 92 | 93 | 93 | 94 | 94 | 95 | 95 | 96 | 96 | 97 | 97 | 98 | 98 | 99 | 99 | 100 | 100 | 101 | 101 |
| 12 | 93 | 94 | 94 | 95 | 95 | 96 | 96 | 97 | 97 | 98 | 98 | 99 | 99 | 100 | 100 | 101 | 101 | 102 | 102 |
| 13 | 94 | 95 | 95 | 96 | 96 | 97 | 97 | 98 | 98 | 99 | 99 | 100 | 100 | 101 | 101 | 102 | 102 | 103 | 103 |
| 14 | 95 | 96 | 96 | 97 | 97 | 98 | 98 | 99 | 99 | 100 | 100 | 101 | 101 | 102 | 102 | 103 | 103 | 104 | 104 |
| 15 | 96 | 97 | 97 | 98 | 98 | 99 | 99 | 100 | 100 | 101 | 101 | 102 | 102 | 103 | 103 | 104 | 104 | 105 | 105 |
| 16 | 97 | 98 | 98 | 99 | 99 | 100 | 100 | 101 | 101 | 102 | 102 | 103 | 103 | 104 | 104 | 105 | 105 | 106 | 106 |
| 17 | 98 | 99 | 99 | 100 | 100 | 101 | 101 | 102 | 102 | 103 | 103 | 104 | 104 | 105 | 105 | 106 | 106 | 107 | 107 |
| 18 | 99 | 100 | 100 | 101 | 101 | 102 | 102 | 103 | 103 | 104 | 104 | 105 | 105 | 106 | 106 | 107 | 107 | 108 | 108 |
| 19 | 100 | 101 | 101 | 102 | 102 | 103 | 103 | 104 | 104 | 105 | 105 | 106 | 106 | 107 | 107 | 108 | 108 | 109 | 109 |
| 20 | 101 | 102 | 102 | 103 | 103 | 104 | 104 | 105 | 105 | 106 | 106 | 107 | 107 | 108 | 108 | 109 | 109 | 110 | 110 |
| 21 | 102 | 103 | 103 | 104 | 104 | 105 | 105 | 106 | 106 | 107 | 107 | 108 | 108 | 109 | 109 | 110 | 110 | 111 | 111 |
| 22 | 103 | 104 | 104 | 105 | 105 | 106 | 106 | 107 | 107 | 108 | 108 | 109 | 109 | 110 | 110 | 111 | 111 | 112 | 112 |
| 23 | 104 | 105 | 105 | 106 | 106 | 107 | 107 | 108 | 108 | 109 | 109 | 110 | 110 | 111 | 111 | 112 | 112 | 113 | 113 |
| 24 | 105 | 106 | 106 | 107 | 107 | 108 | 108 | 109 | 109 | 110 | 110 | 111 | 111 | 112 | 112 | 113 | 113 | 114 | 114 |
| 25 | 106 | 107 | 107 | 108 | 108 | 109 | 109 | 110 | 110 | 111 | 111 | 112 | 112 | 113 | 113 | 114 | 114 | 115 | 115 |
| 26 | 107 | 108 | 108 | 109 | 109 | 110 | 110 | 111 | 111 | 112 | 112 | 113 | 113 | 114 | 114 | 115 | 115 | 116 | 116 |
| 27 | 108 | 109 | 109 | 110 | 110 | 111 | 111 | 112 | 112 | 113 | 113 | 114 | 114 | 115 | 115 | 116 | 116 | 117 | 117 |
| 28 | 109 | 110 | 110 | 111 | 111 | 112 | 112 | 113 | 113 | 114 | 114 | 115 | 115 | 116 | 116 | 117 | 117 | 118 | 118 |
| 29 | 110 | 111 | 111 | 112 | 112 | 113 | 113 | 114 | 114 | 115 | 115 | 116 | 116 | 117 | 117 | 118 | 118 | 119 | 119 |
| 30 | 111 | 112 | 112 | 113 | 113 | 114 | 114 | 115 | 115 | 116 | 116 | 117 | 117 | 118 | 118 | 119 | 119 | 120 | 120 |
| 31 | 112 | 113 | 113 | 114 | 114 | 115 | 115 | 116 | 116 | 117 | 117 | 118 | 118 | 119 | 119 | 120 | 120 | 121 | 121 |
| 32 | 113 | 114 | 114 | 115 | 115 | 116 | 116 | 117 | 117 | 118 | 118 | 119 | 119 | 120 | 120 | 121 | 121 | 122 | 122 |
| 33 | 114 | 115 | 115 | 116 | 116 | 117 | 117 | 118 | 118 | 119 | 119 | 120 | 120 | 121 | 121 | 122 | 122 | 123 | 123 |
| 34 | 115 | 116 | 116 | 117 | 117 | 118 | 118 | 119 | 119 | 120 | 120 | 121 | 121 | 122 | 122 | 123 | 123 | 124 | 124 |
| 35 | 116 | 117 | 117 | 118 | 118 | 119 | 119 | 120 | 120 | 121 | 121 | 122 | 122 | 123 | 123 | 124 | 124 | 125 | 125 |
| 36 | 117 | 118 | 118 | 119 | 119 | 120 | 120 | 121 | 121 | 122 | 122 | 123 | 123 | 124 | 124 | 125 | 125 | 126 | 126 |
| 37 | 118 | 119 | 119 | 120 | 120 | 121 | 121 | 122 | 122 | 123 | 123 | 124 | 124 | 125 | 125 | 126 | 126 | 127 | 127 |
| 38 | 119 | 120 | 120 | 121 | 121 | 122 | 122 | 123 | 123 | 124 | 124 | 125 | 125 | 126 | 126 | 127 | 127 | 128 | 128 |
| 39 | 120 | 121 | 121 | 122 | 122 | 123 | 123 | 124 | 124 | 125 | 125 | 126 | 126 | 127 | 127 | 128 | 128 | 129 | 129 |
| 40 | 121 | 122 | 122 | 123 | 123 | 124 | 124 | 125 | 125 | 126 | 126 | 127 | 127 | 128 | 128 | 129 | 129 | 130 | 130 |
| 41 | 122 | 123 | 123 | 124 | 124 | 125 | 125 | 126 | 126 | 127 | 127 | 128 | 128 | 129 | 129 | 130 | 130 | 131 | 131 |
| 42 | 123 | 124 | 124 | 125 | 125 | 126 | 126 | 127 | 127 | 128 | 128 | 129 | 129 | 130 | 130 | 131 | 131 | 132 | 132 |
| 43 | 124 | 125 | 125 | 126 | 126 | 127 | 127 | 128 | 128 | 129 | 129 | 130 | 130 | 131 | 131 | 132 | 132 | 133 | 133 |
| 44 | 125 | 126 | 126 | 127 | 127 | 128 | 128 | 129 | 129 | 130 | 130 | 131 | 131 | 132 | 132 | 133 | 133 | 134 | 134 |

METHOD OF AND APPARATI FOR SIZING RODEO ROPES

CROSS REFERENCE TO RELATED APPLICATION

This application claims the benefit of U.S. Provisional Application No. 60/943,375 filed on Jun. 12, 2007, entitled "METHOD OF SIZING RODEO ROPES."

FIELD OF THE INVENTION

This invention relates generally to ropes used in competitive roping contest including ropes used for calf roping, team roping (heading and heeling), and steer roping and more particularly to a method for determining what size of loop a roper requires for roping an object according to the roper's loop circumference and hand placement on the rope. As used herein, the terms "size of loop" or "loop size", when discussing the present invention, refer to a novel expression of the relationship of a set of parameters, spoke length S and loop circumference C, that characterizes the location of the "tip" of the loop, the tip being defined as that portion of the loop opposite of where the loop is typically held during competitive use. In this context, tip does to a proximate or distal end of the rope. One purpose for determining the tip location relative to these parameters includes, but is not limited to, establishing the appropriate placement, or verifying the proper existence, of appurtenances and attachments, such as the weighted tip, commonly referred to as a tip accelerator thereto, for the purpose of improving the performance of the loop. Another purpose for determining tip location is to improve the ability to evaluate the performance of loops of different sizes and thus different tip locations.

BACKGROUND

Lariats and rodeo ropes including ropes used for calf roping, team roping (heading and heeling), and steer roping have been used for over a century to catch animals such as cattle, horses, and the like. In addition to traditional uses in the ranching and farming industries, rodeo ropes are essential pieces of equipment for persons competing in roping contests at ropings, rodeos, fairs, and other competitions. Since invention of synthetic twine such as polyester and nylon, the basic components and mechanical performance of rodeo ropes have changed very little.

Figure 1:
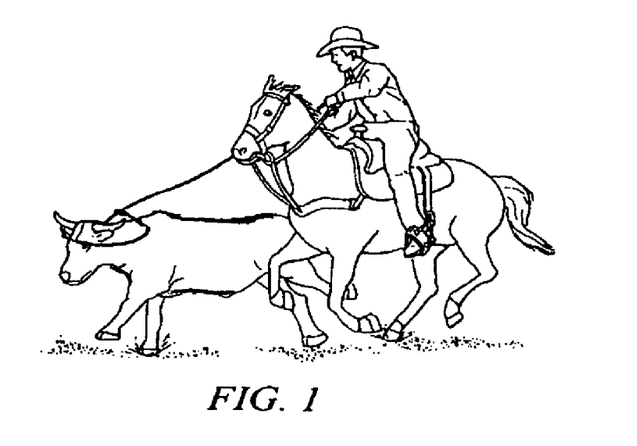
FIG. 1 is a perspective view of a roper throwing a rope around a steer.

Traditionally, each rope comprises a proximate end and a distal end, a knot, typically referred to as a honda knot or a honda on the proximate end, the honda forming an eye, having a loop formed by inserting the distal end through the eye, the loop having a circumference measured from the honda around the length of the loop back to the honda. A user holds the loop in one hand a generally consistent distance from the honda. This section of the rope between the honda and the hand is commonly referred to as the spoke. The roper holds the remaining coils and tail of the rope in the opposite hand. As seen in FIG. 1, conventionally, a competitive roper is mounted on a horse while pursuing an animal, such as a steer. The roper holds the rope having a loop formed through the eye formed by the honda in preparation for throwing the rope around the steer's horns, neck, or legs. Ropers' spoke lengths and loop circumferences vary depending on the roper's preferred roping style, the desired speed of the run, the physical characteristics of the animal being roped (i.e. long or short horns), and the roping conditions (i.e. indoors or outdoors, wind speed).

Conventionally, determination of loop size has relied on a competitor's feel and rough estimation about what size is needed in a rodeo rope without the precision of analytical methods. What is desired is a method of determining loop size which maps to a number of parameters to certain characteristics of a tip accelerator. Such method recognizes that, among other things, proper tip weight distribution is critical for optimum loop performance.

SUMMARY OF THE INVENTION

The present invention comprises a method for determining a loop size which overcomes the foregoing and other difficulties which have long since characterized the prior art. In accordance with the broader aspects of the invention, a method for determining the needed size of a loop comprises measuring loop circumference "C" and spoke length "S" and thereafter referring to a nomograph or physical representation of a rope with predetermined categorical ranges of loop size, each loop size category being predetermined by upper and lower ranges of tip location "T" as calculated by the formula $T=C/2+S$. One such nomograph is a chart comprising a y-axis with values for loop circumference or spoke length measurements, and an x-axis comprising measurements of the opposite variable, the chart illustrating ranges of loop sizes based on various combinations of the two variables.

DESCRIPTION OF THE DRAWINGS

A more complete understanding of the present invention may be obtained by reference to the following Detailed Description, when taken in conjunction with the accompanying Figures, wherein:

FIGS. 5A-5D are charts which may be used in the method for determining loop size according to the present invention.

DETAILED DESCRIPTION

The present invention will now be described more fully with reference to the accompanying drawings, in which preferred embodiments of the present invention are shown. The present invention may, however, be embodied in many different forms and should not be constructed as limited to the embodiments set forth herein; rather, these embodiments are provided so that this disclosure will be thorough and complete, and will fully convey the scope of the present invention to those skilled in the art.

Figure 2:
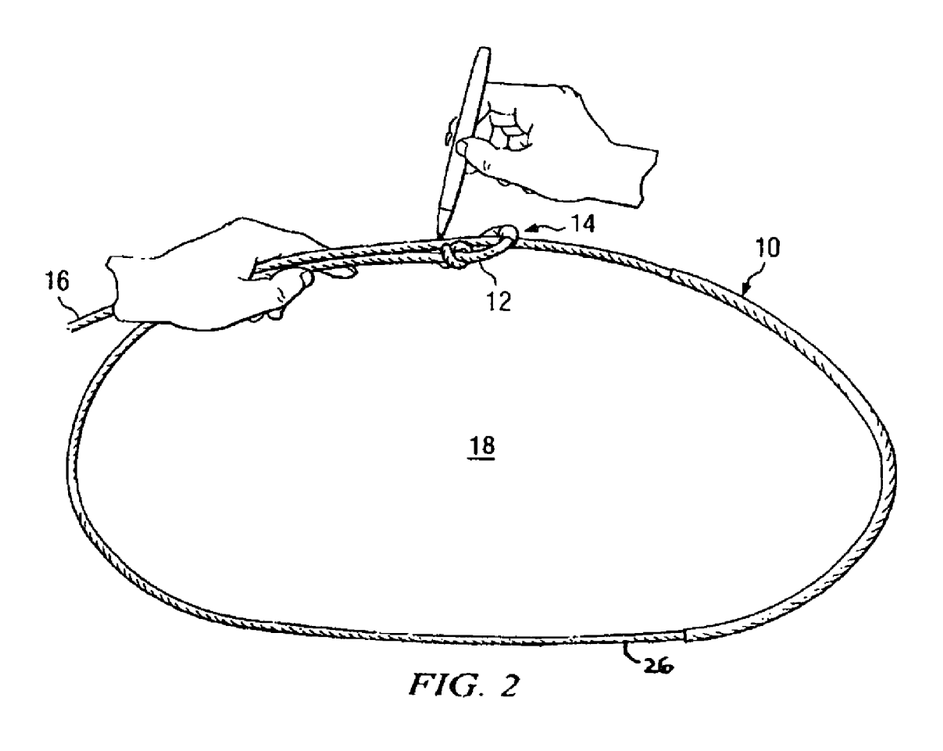
FIG. 2 is a perspective view illustrating an initial step comprising a method for determining a loop size according to an exemplary embodiment of the present invention.

Referring now to the Figures, and particularly to FIG. 2 thereof, there is shown a rodeo rope 26, used by competitive ropers and an illustration of a first step in a method for determining the correct loop size of a competitor's rodeo rope, and more specifically the correct sizing for the loop size of a rope having a weighted tip or tip accelerator 10 such as the rope described in prior commonly assigned patent application Ser. No. 11/538,469 filed Oct. 4, 2006. The rope 26 comprises a knot 12, typically referred to as a honda knot or honda, forming an eye at a proximate end 14 of the rope 26. The rope 26 further comprises a distal end 16 where the roper grips the rope 18. The method for determining correct sizing of a rodeo rope begins with the following first step: the distal end 16 is fed through the eye formed by the honda 12 to form a loop 18 typically formed by the competitor when roping a particular animal, in this example, a steer. Once the loop 18 is formed the competitor makes a mark at a point on the rope where the rope 10 crosses through the eye of the honda 12. This first step is repeated until at least three marks have been made on the rope 10. This is done to obtain an average from the three marks of the length determined in the next step.

Figure 3:
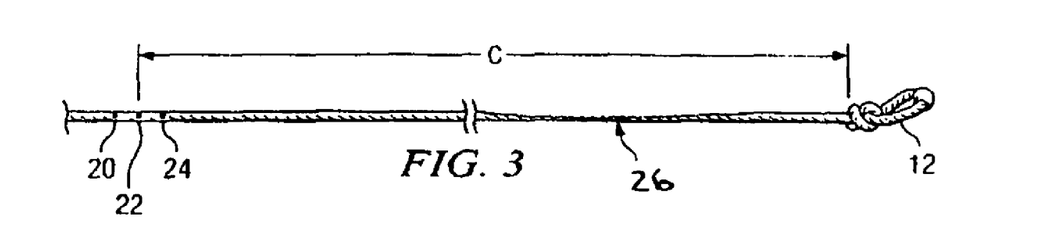
FIG. 3 is a perspective view illustrating a later step in the method.

Referring now to FIG. 3, there is shown a next step in the method for determining the correct sizing of a rodeo rope. In the first step at least three marks were made on the rope 10, the marks indicated by a first mark 20, a second mark 22, and a third mark 24. In order to determine a loop circumference measurement C the competitor selects the mark nearest the center of all three marks, in this example, the second mark 22. The loop circumference is thereafter determined by measuring the distance C between the second mark 22 and the honda 12.

Figure 4:
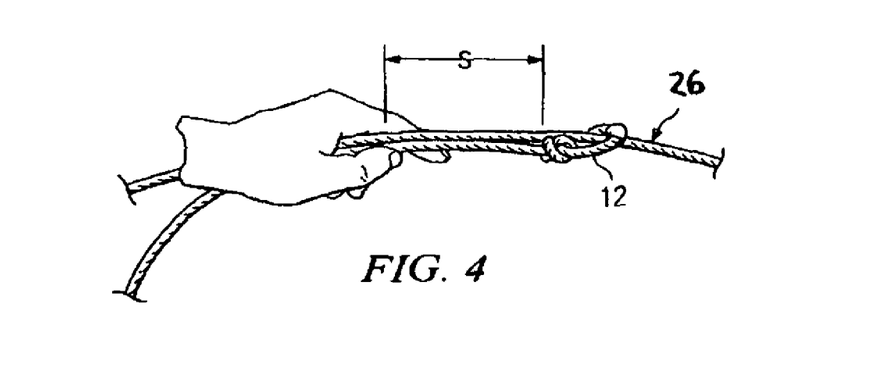
FIG. 4 is a perspective view illustrating a still later step in the method.

Referring now to FIG. 4, there is shown a further step in the method for determining the correct sizing of a rodeo rope. A spoke length S is measured, the term spoke referring to the distance between the honda 12 and the competitor's forefinger placed on the rope 26 at the place where the competitor typically holds the rope 26 when roping.

Figure 5A:
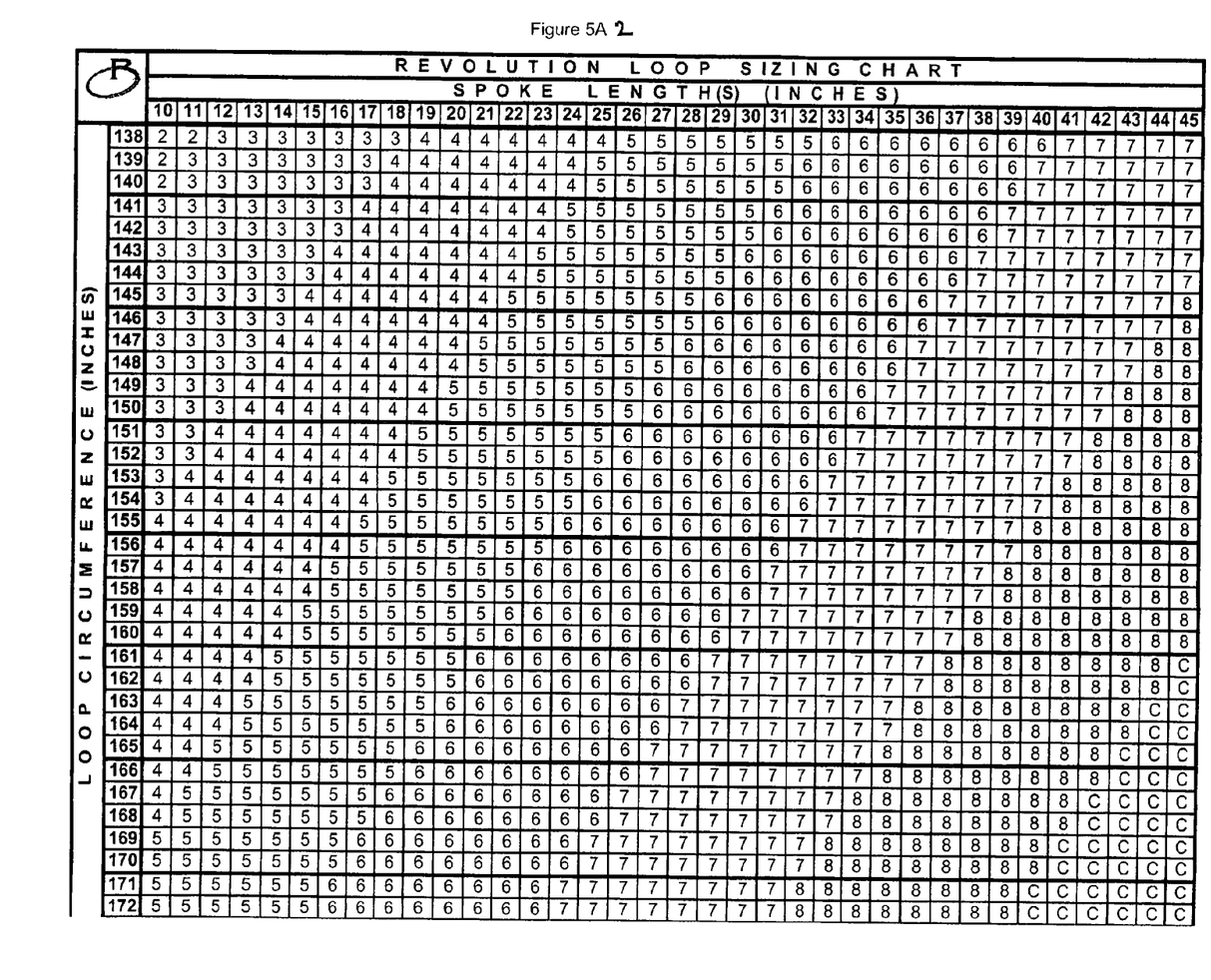

Referring now to FIG. 5A, there is shown a provided chart 40 used in the method for determining the correct loop size of a rodeo rope according to the present invention. The chart 40 has rows (corresponding to an y-axis) comprising values for circumference measurements in inches, and columns (corresponding to an x-axis) comprising spoke measurements in inches, and corresponding loop sizes relative to each circumference measurement and spoke measurement as more fully described below. As one skilled in the art will appreciate, the unit of length used for the circumference and spoke measurement can be any desired unit, including but not limited to inches, millimeters, centimeters, etc. Once the competitor has measured both the circumference C and the spoke S length, the loop size may be determined by finding the circumference C along the y-axis, the measured spoke S length along the x-axis, and then finding the corresponding loop size relative to the measured circumference C and measured spoke S length.

Figure 5B:
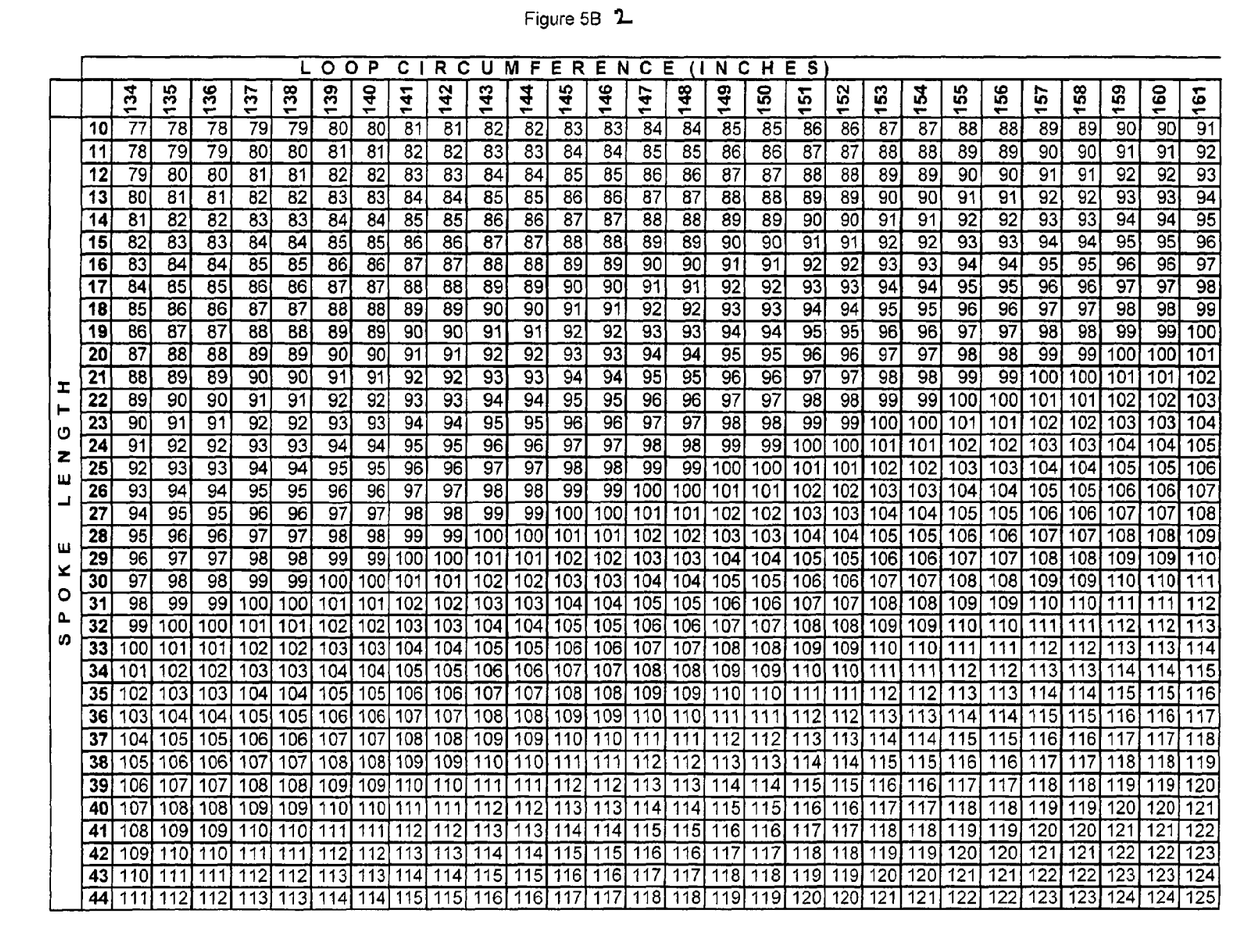

As used herein, the term "loop size" refers to the expression of the relationship of spoke length "S" and loop circumference "C", that characterizes the location of the tip of the loop, the "tip" being defined as that portion of the loop opposite of where the loop is typically held during competitive use as may be determined according to FIGS. 5B-5D. FIGS. 5B-5D represent an expansion of FIG. 5A, wherein the number determined from S (y-axis) and C (x-axis) correlate to the tip location according to (C/2)+S.

As noted herein, the tip is the point on the rope that is measured at approximately (C/2+S). This location generally corresponds to where the rope touches the ground when the roper is naturally holding the rope in the manner seen in FIG. 4, the honda is near the roper's midsection and the rope is oriented such that the plane of the rope is parallel to the roper. In such a position, if the roper places their foot within the looped rope, it should touch the ground about at the tip.

If a rope has a C of more than 117 and less than 128 inches, then the loop size may be from a 1 to 6 depending on the S. Further, if a rope has an S of more than 16 and less than 21 inches, then the loop size may be from a 1 to 7 depending on the C. Similar observations can be made with respect to other combinations of C and S. Once it is determined, with reference to the values of C and S, the value of the loop size, then the loop size may be determined.

For example, with reference to the chart of FIG. 5A, a loop with a spoke length of x and a loop circumference of y corresponds to a loop size of z. The value of z can be mapped from FIG. 5B, as further determined by FIG. 5C.

As one skilled in the art will appreciate, the loop size numbers can instead be represented by any set of units or symbols that are used to identify rope characteristics, including, but not limited to numbers, letters, colors, names, and the like. Further, the present invention can be implemented using a general purpose computer having at least a processor, memory and input and output means such as a keyboard and display or printer, respectively, and software executable thereon, wherein the method of the present invention represent steps used by the software to determine the characteristics of the rope based on the input of certain values, including but not limited to, C and S, the set of parameters being maintained in a table for use by the computer during the execution of the software to determine the loop size. The present invention can further be represented by computer software which implements the steps of the present invention. Such software can be resident on a general purpose computer or can be a distributed computer program for use on a computer network, such as the Internet. In this manner, a roper or purchaser can input into the program, such as an application developed using the JAVA programming language, information such as C and S and such other data which will affect the characteristics of the rope, and the program will determine the loop size.

Such computer system and associated software can be used to calculate and then output data for use in a manufacturing apparatus that is used to manufacture rodeo ropes.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention. In particular, the categories may be divided differently, further subdivided, or reconfigured for various loop size ranges, any combination of which would embody the spirit of the invention.

I claim:

1. A method for determining loop sizes of rodeo ropes, including ropes used for calf roping, team roping (heading and heeling) and steer roping, comprising the steps of:

Providing a rodeo rope having a proximal and distal end and having a honda and an eye formed thereby on the proximate end thereof;

Threading the distal end of the rope through the eye, coiling the tail and holding the coils in one hand, forming a loop of the desired circumference, and holding the loop in the opposite hand the desired distance from the honda;

Determining the loop circumference C by measuring the length of rope between the honda and point where the rope passes through the eye;

Determining the spoke length S by measuring the length of rope between the honda and the hand where the loop is held by the roper;

Referencing a chart depicting various combinations of loop circumference C and spoke length S and corresponding calculations for tip location T relative to the honda based on the formula $T = C/2 + S$, each calculation for T is grouped into a loop size category that is relative to the intended use as a calf rope, head rope, or heel rope, thereby allowing the loop size to be determined.

2. The method of claim 1, wherein the loop size maps to at least one characteristic of the rope selected for the category consisting of: existence and placement of appurtenances therein and attachments thereon such as location and length of a weighting mechanism such as a tip accelerator, including the percentage of the full length of the weighting mechanism on either side of the tip.

3. The method of claim 2, wherein the steps are embodied as software on a computer readable medium and executed by a general purpose computer having at least a processor, memory, input and output device.

4. The method of claim 3, wherein the characteristics corresponding to each loop size are maintained in a table in a memory.

5. The method of claim 3, wherein modules of the software are distributed to a plurality of computers across a computer network.

6. The method of claim 3, wherein the loop size output of the general purpose computer is used as input to a manufacturing apparatus for manufacturing-a rodeo rope.

7. The method of claim 2, wherein the characteristics are at least one selected from the group consisting of: existence and placement of appurtenances and attachments thereon such as location, length and weight of a tip accelerator, the percentage of the full length of the tip accelerator on either side of the tip.

8. The method of claim 7, wherein the steps are embodied as software on a computer readable medium and executed by a general purpose computer having at least a processor, memory, input and output device.

9. The method of claim 8, wherein the predetermined characteristics corresponding to each loop size are maintained in a table in a memory.

10. The method of claim 7, wherein modules of the software are distributed to a plurality of computers across a computer network.

11. The method of claim 7, wherein the loop size output of the general purpose computer is used as input to a manufacturing apparatus for manufacturing ropes.

12. The method of claim 2, wherein the characteristics are the location, length and weight of a tip accelerator and percentage of the full length of the tip accelerator on either side of the tip.

13. The method of claim 12, wherein the steps are embodied in software on a computer readable medium and executed by a general purpose computer having at least a processor, memory, input and output device.

14. The method of claim 13, wherein the characteristics corresponding to each loop size are maintained in a table in a memory.

15. The method of claim 13, wherein modules of the software are distributed to a plurality of computers across a computer network.

16. The method of claim 13, wherein the loop size output of the general purpose computer is used as input to a manufacturing apparatus for manufacturing ropes.

17. An apparatus for determining a loop size of a rodeo rope:
consisting of a rodeo rope whereon various ranges of tip locations T are marked according to the categorical loop size with reference to the relationship $T=C/2+S$, whereby the user can build the desired loop size and hold the loop at the desired distance from the honda, locate the tip of the loop, or point on the loop opposite from the hand, and read the corresponding loop size directly from the apparatus, thus allowing the roper to know his or her loop size.

18. The apparatus of claim 17, wherein the loop size maps to certain, predetermined characteristics of a rope.

19. The apparatus of claim 17, wherein the characteristics are at least one selected from the group consisting of: existence and placement of appurtenances and attachments thereon such as location, length and weight of a tip accelerator, including the percentage of the full length of the tip accelerator on either side of the tip.

* * * * *